Jan. 19, 1943.　　　　C. T. WALTER　　　　2,308,729
WEIGHT CLASSIFIER
Filed July 24, 1940　　　　5 Sheets-Sheet 1.

Charles T. Walter
INVENTOR

BY Roy G. Story
ATTORNEY

ATTEST:
George F. Mueller
Wm. C. Meiser

Charles T. Walter
INVENTOR

BY Roy G. Story
ATTORNEY

Jan. 19, 1943.            C. T. WALTER                2,308,729
                         WEIGHT CLASSIFIER
                        Filed July 24, 1940           5 Sheets-Sheet 3

ATTEST—
George F. Mueller
Wm. C. Meiser

Charles T. Walter
INVENTOR
BY Roy C. Story
ATTORNEY

Jan. 19, 1943.    C. T. WALTER    2,308,729
WEIGHT CLASSIFIER
Filed July 24, 1940    5 Sheets-Sheet 4

Charles T. Walter
INVENTOR

BY Roy G. Story
ATTORNEY

Fig. 13

Patented Jan. 19, 1943

2,308,729

UNITED STATES PATENT OFFICE 2,308,729

WEIGHT CLASSIFIER

Charles T. Walter, Chicago, Ill., assignor to Industrial Patents Corporation, Chicago, Ill., a corporation of Delaware Application July 24, 1940, Serial No. 347,250

8 Claims. (Cl. 209—121)

This invention relates to grading apparatus.

One of the objects of this invention is to provide an automatic weighing and grading apparatus.

Another object of this invention is to provide automatic weighing and grading apparatus which is highly reliable and rugged in construction.

Other objects and advantages of this invention will become apparent from the description and claims which follow.

In many industries it is desired to grade various products and classify the products according to weight. In general, products and articles have been graded manually. Manual grading and classification of products based on weight involves handling of the product and requires considerable time. The operator must first pick up the article, place it on a scale, note the weight of the article, and then transfer the article to a proper conveyor or bin. In grading hams, for example, a bin or truck for a certain weight class of hams may be positioned at some distance from the operator and, as a result, the operator throws the ham into the bin from his position. This abusive handling of the ham results in bruising of the meat, and, in many cases, in tearing a part of the flesh.

In accordance with my invention, a series of articles to be graded is passed over a weighing scale and the articles are graded automatically. No manual handling of the products is required, and the articles are not subjected to abusive handling or treatment.

In the drawings, similar reference characters in the several figures are used to indicate similar elements. In the specification, like members in different stations are designated by the same numeral followed by a letter designating the station.

The apparatus consists essentially of an endless conveyor adapted to move intermittently the product or articles to be graded over a scale and a series of cooperating pivotally mounted discharge doors. In the apparatus as illustrated in the drawings, scale 1 is rigidly mounted on frame 2. An endless conveyor 3 passes over sprocket wheels 4 and 5, which are mounted on shafts 6 and 7, respectively. The shafts are, in turn, mounted on frame 2 by suitable bearing blocks 8 and 9. The conveyor comprises a pair of endless chains 10 connected by uniformly spaced flight members 11. The spacing between the flight members is dependent upon the nature of the articles to be graded and upon the width of the scale platform. The conveyor is driven through sprocket wheel 5 by means of a suitable driving means 12.

A fixed stationary platform 13 is mounted on the frame 2 between sprocket wheel 5 and scale 1. In the apparatus as illustrated, four discharge stations, A, B, C, and D are provided. Discharge door 14a is pivotally mounted on frame 2 adjacent scale 1 to form station A. A series of discharge doors 14b, 14c, and 14d are mounted pivotally along frame 2 forwardly of door 14a to form stations B, C, and D, respectively. A series of chutes 15a, 15b, 15c, and 15d are positioned beneath discharge doors 14a, 14b, 14c, and 14d, respectively. An open chute 16 is positioned forwardly of discharge door 14d and its cooperating chute 15d.

Figures 6, 7, 8:
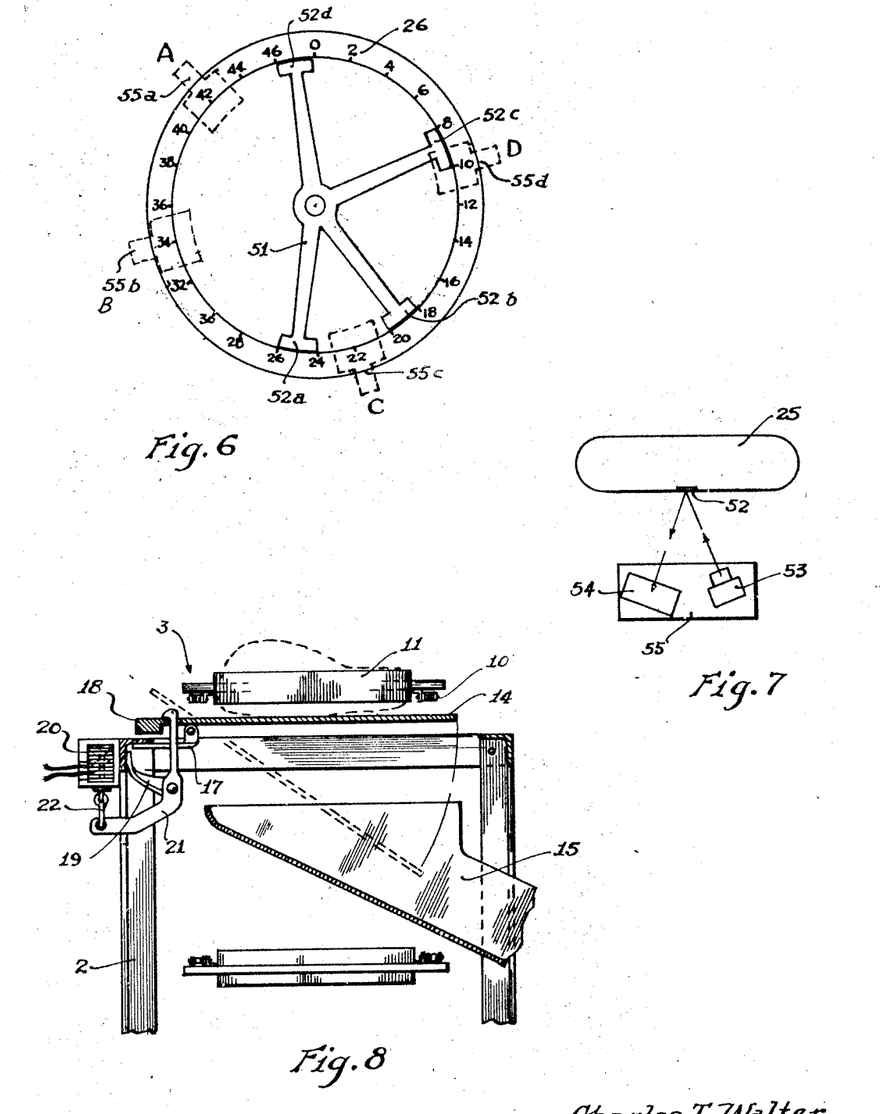
Figure 6 is a front view of the scale face.
Figure 7 is a diagrammatic illustration showing the relation between the light source, photoelectric cell, and scale face.
Figure 8 is a sectional view of the discharge mechanism taken on line 8—8 of Figure 1.

The construction of the discharge doors and the relation of the chutes is clearly illustrated in Figure 8. It will be understood that each of the discharge doors and its cooperating chute is similar in construction. A pair of brackets 17 are rigidly mounted on frame 2 and are adapted to support pivotally discharge door 14.

The discharge door is preferably provided with a counterweight 18 which is adapted to maintain the door in a substantially horizontal position.

A bracket 19 and solenoid 20 are mounted rigidly on frame 2 at a position about midway between brackets 17. Latch member 21 is supported pivotally on bracket 19 and is operatively connected to solenoid 20 by link 22. In the normal position of solenoid 20, latch member 21, and discharge door 14, the door is maintained in a substantially horizontal position by means of latch member 21, regardless of the weight of any article placed upon the door. When solenoid 20 is energized, latch member 21 is released and the article on the door causes the discharge door to pivot on brackets 17 into the position indicated by broken lines, and the article is discharged into chute 15. As the article passes from the discharge door into the chute, counterweight 18 returns the discharge door to a substantially horizontal position.

Figures 4, 5:
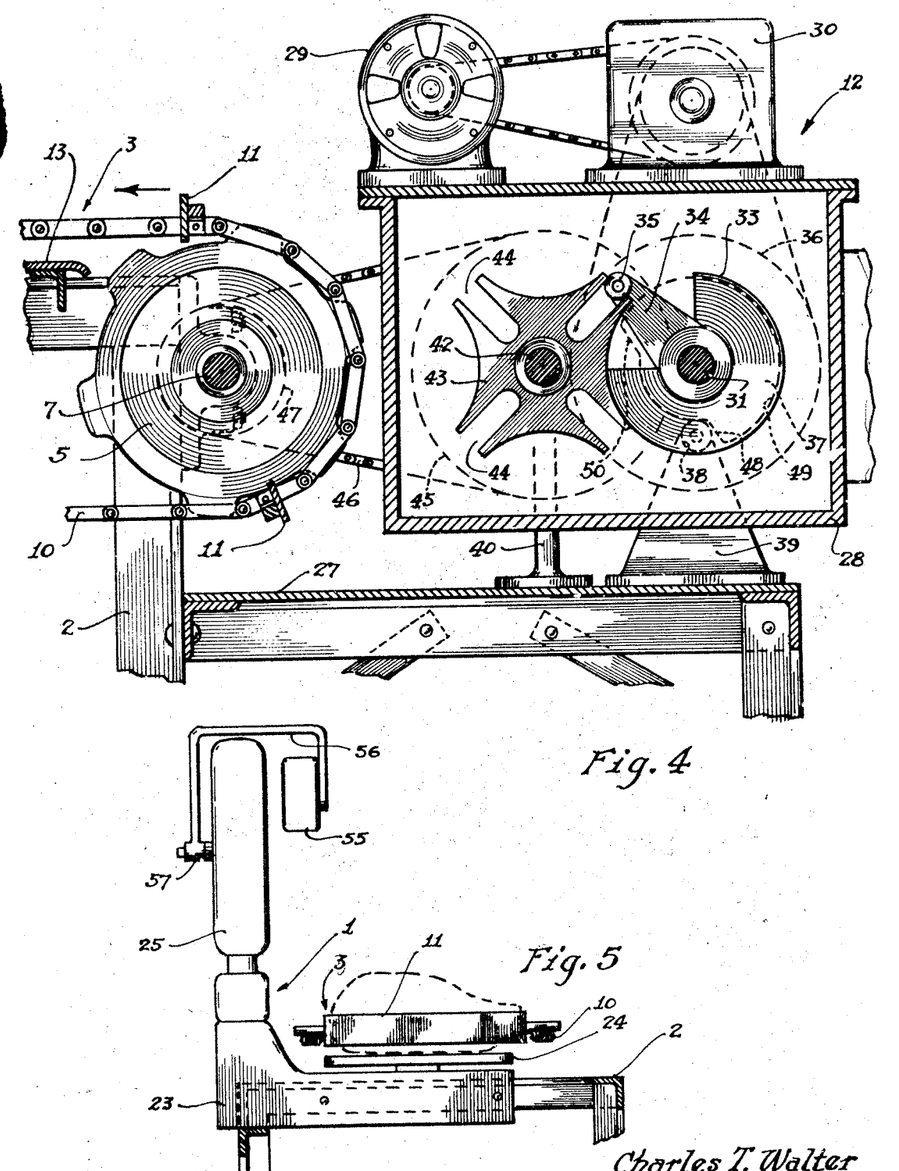
Figure 4 is a vertical sectional view of the conveyor drive means taken on line 4—4 of Figure 3.
Figure 5 is a side view of the scale member.

The scale may be of standard construction with the exception of the addition of photoelectric means adapted to effect an actuation of the solenoids of the various stations along the conveyor. The scale comprises a base 23 which is secured to frame 2, a scale platform 24, and a scale face housing 25. The scale is provided with a face 26 having the desired weight indicia. The scale is mounted on frame 2 so that the scale platform is in the same common plane with fixed platform 13 and discharge doors 14.

Figure 1:
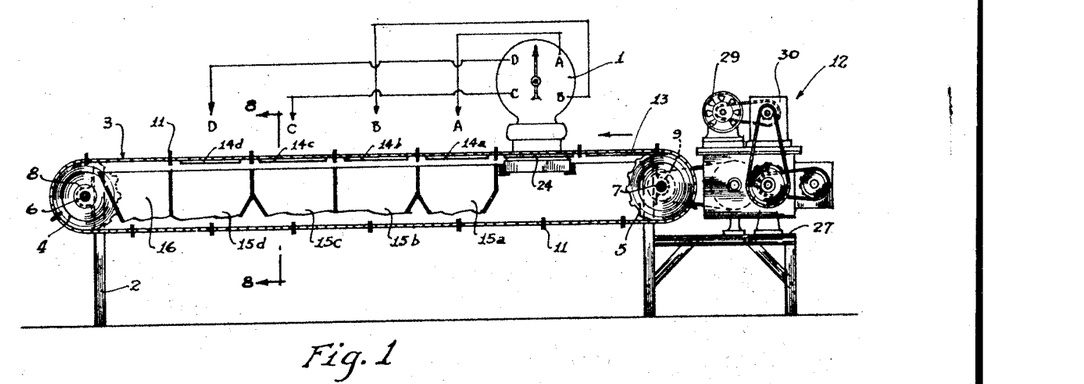
Figure 1 is a front elevational view, partly in section, of the grading apparatus of this invention.
Figure 2:
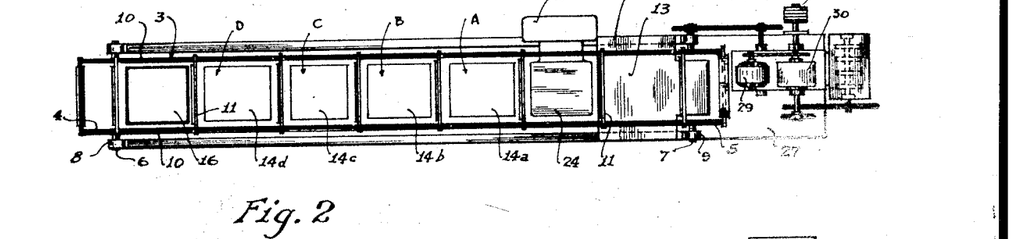
Figure 2 is a plan view of the apparatus of Figure 1.
Figure 3:
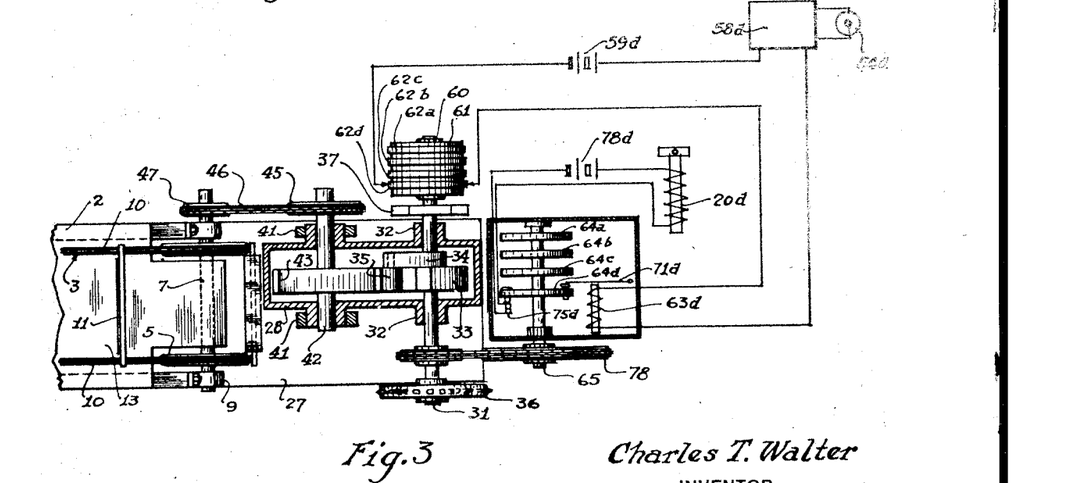
Figure 3 is a plan view, partly in section, of the conveyor drive means including a diagrammatic illustration of a portion of the electrical control apparatus.

The conveyor 3 is driven intermittently to advance the articles being graded one station at each movement of the conveyor. The conveyor is preferably driven by means of a Geneva cam mechanism. A platform 27 is mounted on frame 2 and supports a housing 28. The mechanism is driven by a source of power, for example, an electric motor 29, through a speed reducer 30. A shaft 31 is journaled in bearings 32, which may be integral with casing 28. A locking disk 33 having a portion of one quadrant removed is secured on shaft 31. Arm 34 is secured to shaft 31 adjacent locking disk 33, the outer end of arm 34 carrying a driving roller 35. A sprocket wheel 36 and cam 37 are secured on shaft 31 externally of the housing 28. A cam roller 38 is supported in operative relation with cam 37 by means of a bracket 39, which is rigidly secured to platform 27.

The housing 28 is pivotally mounted above platform 27 by means of standards 40, which are rigidly secured to platform 27 and terminate in bearings 41. A shaft 42 passes through housing 28, being concentric with respect to bearings 41. A Geneva wheel 43 provided with four uniformly spaced radial slots 44 is securely mounted on shaft 42 in operative relation with respect to drive roller 35 and locking disk 33. A sprocket wheel 45 is securely mounted on shaft 42 external of casing 28. Sprocket wheels 5 are driven from sprocket wheel 45 through a belt or chain drive 46 and sprocket wheel 47. Locking disk 33 prevents rotation of Geneva wheel 43 except during the period of rotation of the Geneva wheel by means of drive roller 35.

One complete revolution of sprocket wheel 36 and shaft 31 determines one cycle of operation of the conveyor mechanism. The relationship between the diameter of sprocket wheels 45, 47, and 5, the number of teeth in these sprocket wheels, and the number of pitches in the conveyor chain between adjacent flights must be such that the conveyor is displaced an amount equal to the distance between each adjacent flight on the conveyor chain for each revolution of shaft 31.

To insure accuracy in weighing each article which is transferred to the scale platform, it is necessary that the article at the time of weighing be out of contact with the conveyor flights 11. In transferring the article from fixed platform 13 to scale platform 24, the article attains a certain velocity and continues to move in a forwardly direction by inertia. In the case of hams, for example, the hams, after being moved upon the scale platform, will generally come to rest against the forward conveyor flight member. In order to free the article from contact with the flight member, the conveyor is given a further slight forward motion.

This additional forward motion is obtained by means of cam 37 and cam follower 38. Shaft 31 is rotated in a clockwise direction. In Figure 4, therefore, the position of the elements indicates that the conveyor displacement has been completed due to the rotation of Geneva wheel 43. Further rotation of shaft 31 causes leading edge 48 of cam 37 to ride on cam roller 38. As edge 48 rides on cam 37, the housing 28 is rotated through a small angle in a counterclockwise direction with respect to the axis of shaft 42. The amount of rotation of the housing 28 is determined by the height of the cam 37. Since Geneva wheel 43 is locked against rotation by disk 33 during the period in which peripheral edge 49 of cam 37 rides upon roller 38, the Geneva wheel is rotated counterclockwise with casing 28. Sprocket wheel 45 is also rotated with the housing, thereby causing a slight forward motion of conveyor 3. During a substantial portion of the rotation of shaft 31 the outer peripheral edge 49 of cam 37 maintains the housing in an angular position as this edge rides upon roller 38. The article is weighed on the scale during the period in which the housing 28 is maintained in an angular position and after the conveyor has been moved forwardly the additional distance.

As shaft 31 continues to rotate, the trailing edge 50 of cam 37 rides down on roller 38 to rotate the housing in a clockwise direction and to return it to its initial position. As housing 28 rotates in a clockwise direction and since Geneva wheel 43 is locked against free rotation, Geneva wheel 43 together with shaft 42 and sprocket wheel 45 likewise are rotated in a clockwise direction with the housing. This rotation of sprocket wheel 45 is transmitted to the conveyor, and the conveyor is returned a distance equal to the distance it was advanced by the counterclockwise rotation of housing 28. Further rotation of shaft 31 causes drive roller 35 to enter a slot 44 in Geneva wheel 43 and rotate Geneva wheel 43 in a counterclockwise direction. Such rotation causes a forward motion of conveyor 3 a distance equal to the distance between adjacent conveyor flights 11.

The usual scale pointer is replaced by a spider member 51, which carries mirrors 52a, 52b, 52c, and 52d. The mirrors may be spaced any desired distance. In each instance, the leading edge of the mirror may be referred to as a reading edge or point. Each mirror embraces an angular distance which is as great as the weight classification between the grades. For example, if it is desired to grade hams into weight groups of 16 pounds and over, 14 to 16 pounds, 12 to 14 pounds, 10 to 12 pounds, and under 10 pounds, the mirrors in each instance should embrace an angular distance equivalent to the angular distance embraced by a differential of 2 pounds on the scale dial. The mirror 52a is employed in operating station A, which selects hams weighing 16 pounds or over. Mirror 52b serves to control station B, which selects hams weighing from 14 to 16 pounds. Mirror 52c serves to control station C, which selects hams weighing from 12 to 14 pounds. Mirror 52d serves to control station D, which selects hams weighing from 10 to 12 pounds.

A light source 53 and a photoelectric cell 54 are mounted in each of the casings 55 (see Figure 6). Each casing is supported by a frame 56, which is, in turn, mounted on a pivot 57 concentric with respect to spider 51. In the particular apparatus illustrated, four such units are provided, one for controlling each of the stations A, B, C, and D. The angular distance represented by a differential of 2 pounds on the scale dial is so small that it will not permit mounting of all of the control elements in a single casing. To overcome the space limitations, a separate mirror and separate photoelectric unit are provided for each weight classification. The photoelectric unit which is adapted to control station A is positioned so that the light from light source 27a strikes the scale dial at the 42 pound indicium. The photoelectric unit which is adapted to control station B is positioned so that the light from light source 27b strikes the scale dial at the 32 pound indicium. The photoelectric unit which is adapted to control station C is positioned so that the light from light source 27c strikes the scale dial at the 22 pound indicium. The photoelectric unit which is adapted to control station D is positioned so that the light from light source 27d strikes the scale dial at the 10 pound indicium.

Each of the photoelectric cells is connected electrically with an amplifier unit which is in turn connected electrically with a commutator, battery, and relay. The electrical circuit is illustrated diagrammatically in Figure 3, in which I have illustrated the electrical control system for station D. A commutator 60 is fixed to shaft 31 and comprises a cylinder of insulating material 61 carrying conductors 62a, 62b, 62c, and 62d, one conductor for each photoelectric unit and station. Photoelectric cell 54d is connected electrically to amplifier 58d which is in turn connected electrically to battery 59d, conductor 62d, and relay 63d. The commutator is adapted to close the circuit through the amplifier, battery, and relay for a short period during each revolution of shaft 31. Light entering the photoelectric cell sets up currents which are transmitted to the amplifier and when the commutator closes the circuit, the relay is actuated. If no light strikes the photoelectric cell during the period in which the commutator closes the circuit, no currents are set up in the amplifier and the relay is not actuated.

Figure 9:
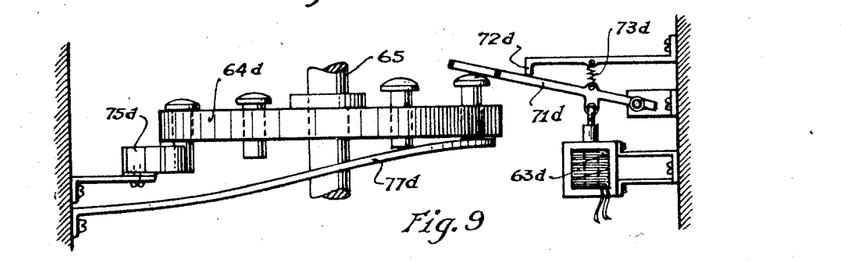
Figure 9 is an elevational view of a rotary switch actuating member.
Figure 10:
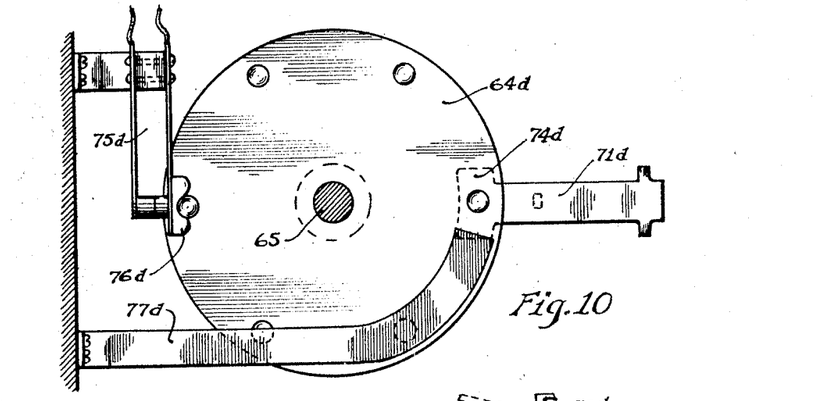
Figure 10 is a plan view of the rotary switch of Figure 9.
Figure 11:
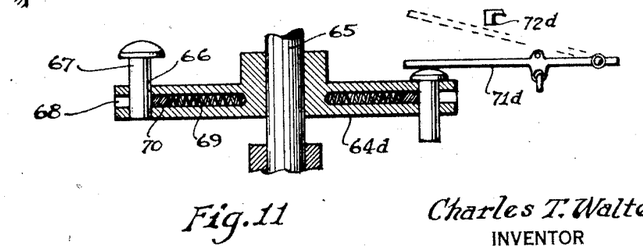
Figure 11 is a transverse sectional view of the rotary switch actuating member of Figures 9 and 10.
Figure 12:
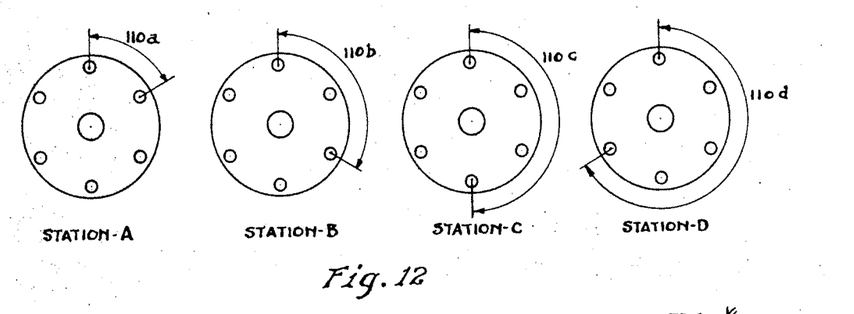
Figure 12 is a diagrammatic view illustrating the phase relationship between the switch actuating members of Figures 12 and 13.

A rotary switch actuating element is provided for each of the photoelectric units. The construction of the switch actuating elements is illustrated in Figures 9 to 11 in which I have illustrated the element and associated members for controlling station D. The switch actuating element consists of a disk 64d, preferably of metal, mounted on shaft 65. Each disk is provided with a plurality of apertures 66 adapted to receive pins 67. The pins are fitted into the apertures with an easy sliding fit. The disk may be provided with radial recesses 68. A light spring 69 and plunger 70 are positioned in recess 68 and are adapted to furnish sufficient friction to prevent the free movement of pins 67 in openings 66.

Relay 63d is supported adjacent disk 64d and is provided with an armature 71d. The armature 71d is constantly urged upwardly against support 72d by means of a tension spring 73d. The free end of armature 71d overlies the marginal portion of disk 64d and is preferably widened as at 74d to embrace as wide an angle of disk 64d as may be desired.

A switch 75d is mounted immediately beneath disk 64d, contact shoe 76d of the switch being in a position so that any depending pins close the switch as the disk rotates and moves the pins across the contact shoe area. The switch is mounted in phase relation with respect to the relay and armature, the particular phase relation being dependent upon the station which is to be controlled through the particular disk, relay, and switch.

A cam member 77d is mounted adjacent the disk 64d in such a position that any depending pins will be forced upwardly in openings 66 so that the lower ends of the pins are flush with the lower surface of the disk as they are moved under the portion 74d of armature 71d. This cam member is located at a point beyond the switch actuating shoe to return the pins to their initial position before they are moved under armature 71d.

The number of pins in any disk may be any convenient number. The minimum number, however, is one greater than the number of photoelectric circuits and stations to be controlled. In the example illustrated, six pins are shown for operation of four stations. The number of disks mounted on the shaft is equal to the number of photoelectric units and stations which are involved. The shaft 65 upon which the disk members are mounted is rotated in synchronism with the rotation of the driving shaft 31. This may be conveniently accomplished through a chain drive 78. For each rotation of shaft 31, shaft 65 must rotate through an angular distance equal to the angular distance between two adjacent pins 67, which in the example illustrated is 60°. The relation between the speed of rotation of shaft 31 and shaft 65 is directly proportional to the number of pins in each disk. In the example illustrated, the shaft 31 makes 6 revolutions for each revolution of shaft 65.

In the operation of the electrical control apparatus, light from light source 53d strikes mirror 52d, assuming that mirror 52d is positioned at the 10 pound indicium, and is reflected into photoelectric cell 54d. Light falling on the photoelectric cell sets up a current in amplifier 58d, causing a current to flow through battery 59d and relay 63d, assuming that the circuit is closed through conductor 62d. Such flow of current causes armature 71d of the relay to be pulled downwardly, thereby forcing one of the pins downwardly in aperture 66 of disk 64d to a position as illustrated in Figure 11. The circuit through the relay is then broken by rotation of commutator 60 and the armature is drawn upwardly by spring 73d. Disk 64d is rotated continuously and as the lower depending portion of pin 67 strikes shoe 76d, switch 75d is closed. Closing of switch 75d causes a current to flow through battery 78d and solenoid 20d. Current flowing through solenoid 20d causes an unlocking of the associated discharge door 14d, permitting the door to pivot and discharge any article on the door into the cooperating chute.

During each cycle, an article is weighed and stations A, B, C, and D must be operated. Considering one article, the article is moved during the first cycle from fixed platform 13 to the scale platform 24. After a suitable period which is allowed for the scale to come to rest, the circuit through the amplifier 58, battery 59, and relay 63 of each photoelectric unit is closed so that an appropriate relay may be actuated to depress a switch operating pin depending upon the weight of the article.

During the second cycle of operation, the article is advanced from the scale platform to station A. At the same time, the disk elements 64 rotate through an angular distance equivalent to the angular distance between adjacent pin apertures. In order that discharge door 14a at station A may be released if the article falls within the particular weight range selected by this station, the switch 75a must be operated from a position which is advanced from the relay position an amount equal to the angular displacement of the pin during one cycle of operation, in the example illustrated, an angle of 60°. If the article has been of the weight selected at station A, a switch actuating pin 67 will have been pressed downwardly by the armature 71a during the first cycle, and the depending portion of the pin will strike shoe 76a, closing switch 75a and thereby release latch 21a to unlock discharge door 14a. If the article is not of sufficient weight to actuate the photoelectric unit associated with relay 63a, the pins 67 will not be pressed downwardly, and switch 75a will not be actuated. During the second cycle, therefore, discharge door 14a will remain in locked position.

During the third cycle of operation, the article will be moved to station B and will rest upon discharge door 14b. During this period, the disk elements 64 rotate through an angular distance equivalent to the angular distance between adjacent pin apertures. In order that the discharge door 14b may be released if the article falls within the particular weight range selected by this station, the switch 75b must be operated from a position which is advanced from the relay position an amount equal to twice the angular displacement of the pin during two cycles of operation, in the example illustrated, an angle of 120°. If the article has been of the weight selected at station B, a switch actuating pin 67 will have been pressed downwardly by the armature 71b during the first cycle and the depending portion of the pin will strike shoe 76b, closing switch 75b and thereby releasing latch 21b to unlock discharge door 14b. If the article is not of sufficient weight to actuate the photoelectric unit associated with relay 63b, the pin 67 will not be pressed downwardly, and switch 75b will not be actuated. As a result, discharge door 14b remains in locked position and the article will be carried to the next station.

During the fourth cycle of operation, the article will be moved to station C and will rest upon discharge door 14c. During the fourth cycle, the disk elements 64 rotate through an angular distance equivalent to the angular distance between adjacent pin apertures. In order that the discharge door 14c may be released if the article falls within the particular weight range selected by this station, the switch 75c must be operated from a position which is advanced from the relay position an amount equal to three times the angular displacement of the pin during three cycles of operation, in the example illustrated, an angle of 180°. If the article has been of the weight selected at station C, a switch actuating pin 67 will have been pressed downwardly by the armature 71c during the first cycle and the depending pin will strike shoe 76c, closing switch 75c and thereby releasing latch 21c to unlock discharge door 14c. If the article is not of sufficient weight to actuate the photoelectric unit associated with relay 63c, the pin 67 will not be pressed downwardly, and switch 75c will not be actuated. As a result, discharge door 14c remains in locked position and the article will be carried to the next station.

During the fifth cycle of operation, the article will be moved to station D and will rest upon discharge door 14d. During the fourth cycle, the disk elements 64 rotate through an angular distance equivalent to the angular distance between adjacent pin apertures. In order that the discharge door 14d may be released if the article falls within the particular weight range selected by this station, the switch 75d must be operated from a position which is advanced from the relay position an amount equal to four times the angular displacement of the pin during four cycles of operation, in the example illustrated, an angle of 240°. If the article has been of the weight selected at Station D, a switch actuating pin 67 will have been pressed downwardly by the armature 71d during the first cycle and the depending pin will strike shoe 76d, closing switch 75d and thereby releasing latch 21d to unlock discharge door 14d. If the article is not of sufficient weight to actuate the photoelectric unit associated with relay 63d, the pin 67 will not be pressed downwardly, and switch 75d will not be actuated. As a result, discharge door 14d remains in locked position and the article will be carried to the open chute 16 during the sixth cycle.

As the disks 64 continue to rotate, cams 77 reset any depressed pins to their original position, that is, into a position in which their lower ends are flush with the lower surface of the disk members. In the example of the disk members illustrated in the drawings, the disk members are rotated once to every six revolutions of shaft 31. If a greater number of pins is employed, the disks are rotated at a proportionately lower rate. The disks permit a delayed action of the solenoids which control the locking and unlocking of the discharge doors.

In Figure 6, the spider 51 is shown in the zero position, that is, the position occupied by the spider when no article is on the scale platform. The leading edge of mirror 52d corresponds to the line of the conventional pointer. When an article is placed on the scale platform, spider 51 is rotated in a clockwise direction, the leading edge of mirror 52d indicating the weight of the article. Assuming the article weighs 7 pounds, mirror 52d will occupy an angular position between the 5 pound and the 7 pound indicia. Mirror 52c will occupy an angular position between the 15 pound and the 17 pound indicia. Mirror 52b will occupy an angular position between the 25 pound and the 27 pound indicia. Mirror 52a will occupy an angular position between the 31 pound and the 33 pound indicia. Light from the light sources 53d, 53c, 53b, and 53a will not strike a mirror, and no light will be reflected into the associated photoelectric cells. In this position of the mirrors, therefore, when the commutators close the circuits through the relays 72, no current will flow through the relays since the photoelectric cells have not been energized.

Assuming the article weighs 11 pounds, mirror 52d will occupy an angular position between the 9 pound and the 11 pound indicia. Mirror 52c will occupy a position between the 19 pound and the 21 pound indicia. Mirror 52b will occupy a position between the 29 pound and the 31 pound indicia. Mirror 52a will occupy a position between the 35 pound and the 37 pound indicia. In this position, light from light source 53d will strike mirror 52d and will be reflected into photoelectric cell 54d. Conductor 62d will close the circuit through amplifier 58d, battery 59d, and relay 63d. Armature 71d will, therefore, press a pin downwardly so that on rotation of disk 64d, the pin will actuate switch 75d to unlock discharge door 14d during the appropriate cycle. The article which will have been moved from the scale to discharge door 14d during the transpired cycles will be discharged into chute 15d.

If the article weighs between 12 and 14 pounds, for example, 13 pounds, mirror 52d will occupy an angular position between the 11 pound and the 13 pound indicia. Mirror 52c will occupy an angular position between the 21 pound and the 23 pound indicia. Mirror 52b will occupy an angular position between the 31 pound and the 33 pound indicia. Mirror 52a will occupy an angular position between the 37 pound and the 39 pound indicia. In this position of the spider and mirrors, mirror 52c is the only one which is capable of reflecting light from the light source to the photoelectric cell. When the conductor 62c of the commutator closes the circuit, it will cause relay 63c to press downwardly a pin in disk 64c. The other relays will not be energized. As the members 64 are rotated, the depressed pin in member 64c will close switch 75c to unlock discharge door 14c. At this time the article will have been carried over onto discharge door 14c and will be discharged into chute 15c.

Assuming the article to weigh between 14 and 16 pounds, for example, 15 pounds, mirror 52d will occupy an angular position between the 13 pound and the 15 pound indicia. Mirror 52c will occupy an angular position between the 23 pound and 25 pound indicia. Mirror 52b will occupy an angular position between the 33 pound and the 35 pound indicia. Mirror 52a will occupy an angular position between the 39 pound and the 41 pound indicia. In this position of the spider, mirror 52b will reflect light into its associated photoelectric cell to actuate relay 63b. Upon closing of the circuit by commutator 62b, relay 63b will depress a pin in disk 64b. Upon rotation of disk 64b, the depressed pin will close a cooperating switch 75b to unlock discharge door 14b. The article will have been placed upon discharge door 14b and will be discharged into chute 15b.

If the article weighs over 16 pounds, for example, 17 pounds, mirror 52d will occupy a position between the 15 pound and 17 pound indicia. Mirror 52c will occupy an angular position between the 25 pound and 27 pound indicia. Mirror 52b will occur an angular position between the 35 pound and 37 pound indicia. Mirror 52a will occupy an angular position between the 41 pound and 43 pound indicia. Mirror 52a will reflect the light into its cooperating photoelectric cell and upon closing of the circuit by conductor 62a, relay 63a will be energized and will press downwardly a pin in disk 64a. Upon rotation of disk 64a and after the conveyor has moved the article from the scale platform to station A, the depressed pin will close switch 75a, thereby unlocking discharge door 14a. The article will be discharged into chute 15a.

Figure 13:
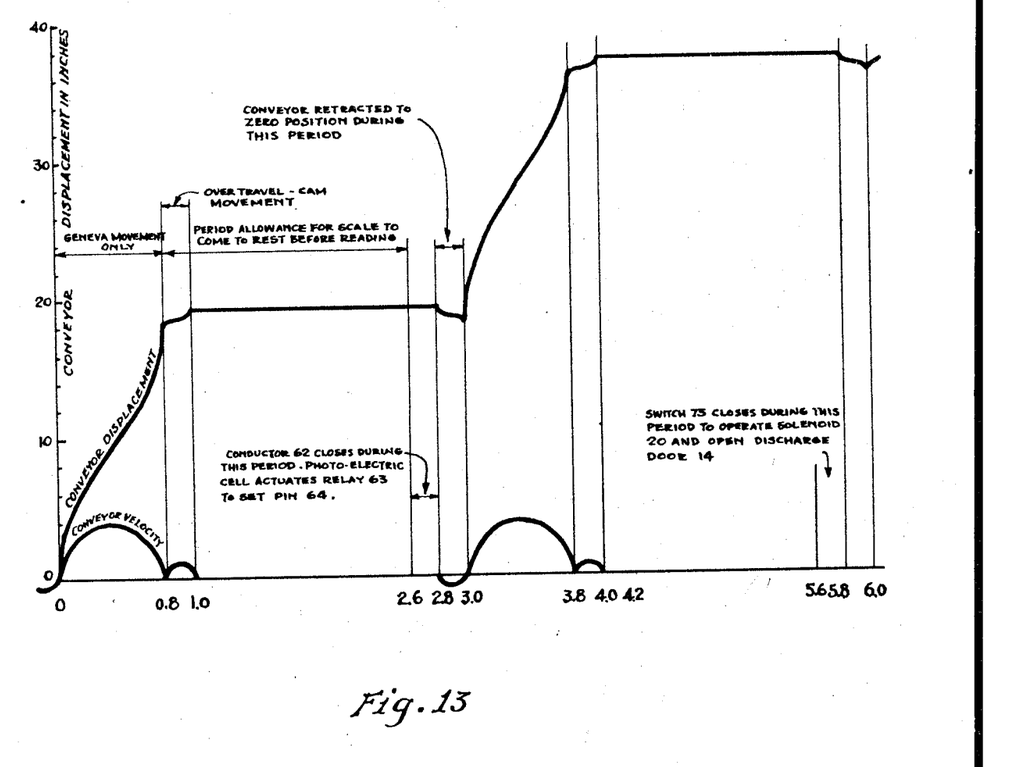
Figure 13 is a timing diagram for the apparatus.

Considering the action of the apparatus with respect to the diagram of Figure 13, the conveyor is displaced by the Geneva wheel motion during the first 0.8 second. To eliminate errors due to the article resting against the forward flight member of the conveyor, the conveyor is displaced a small amount during the next 0.2 second by the action of cam 37 and cam roller 38. The conveyor then remains stationary for a period of 1.8 seconds, 1.6 seconds being allowed for the scale to come to rest, and commutator 60 then closes the circuit through relays 63a, 63b, 63c, and 63d for a period of about 0.2 second. This period of 0.2 second is sufficient to actuate the appropriate relay and press downwardly the corresponding pin 67 in the disk 64. During the next 0.2 second, the conveyor is retracted by the action of cam 37 and cam follower 38. The conveyor is then again displaced by the movement of the Geneva cam and the cycle is repeated.

During the period of one revolution of shaft 31, the rotary switch actuating members 64 rotate through an angular distance equal to the angular distance between two adjacent pins. Shoe 76 of switch 75 will be actuated by a pin prior to the full angular rotation of the disks 64. If a pin 67 has been pressed downwardly by a relay armature, switch 75 will be closed during the period in which the conveyor remains stationary. In the displacement time diagram, the switch will be closed during the latter part of the period during which the conveyor remains in a stationary position. If it is desired to operate the switch 74 at an earlier time, the shoe 76 and switch 75 may be moved rearwardly the desired amount to give any desired timing to the closing of switch 75 and the unlocking of the discharge door. It will be understood that the same remarks apply to the positioning of switch 75 for the switch actuating members associated with each station.

The number of discharge doors which are provided is dependent upon the number of weight classifications which are desired. It is apparent that for each discharge door which is provided it is necessary to also provide a photoelectric unit, a mirror on spider 51, and the various electrical units. It is also apparent that the weight classifications need not be placed in the order as has been done in illustrating the invention. The angular width of the mirrors on the spider is dependent solely upon the range in weight desired in any group or classification. The time allowed for the scale to come to rest before the conductors 62 close the circuit through the amplifier and relay depends upon the individual scale and the scale vibrations which occur before the pointer comes to rest. It is apparent that in designing the spider 51 and in positioning the photoelectric units, the mirrored surfaces and the units must be spaced apart an angular distance so that in no event will two mirrors be in a position to reflect light into a photoelectric cell at the same setting or reading of the scale.

I claim:

1. A grading device comprising a weighing means having a weighing platform operatively connected with a movable weight indicator, a series of movable discharge platforms successively arranged to one side of the weighing platform, intermittently operable means adapted to move an article to be graded successively onto the weighing platform and onto the movable discharge platforms, and a series of photoelectric means associated with the movable weight indicator and selectively with each of the movable discharge platforms, each of the photoelectric means being classified within a particular weight range and adapted upon movement of the movable weight indicator in its particular weight range upon movement of the article upon the weighing platform to cause operation of its associated movable discharge platform, and timing means cooperating with said photoelectric means and said discharge platforms to discharge the article upon timed movement of the article upon the particular movable discharge platform.

2. A grading device comprising a weighing means having a weighing platform operatively connected with a movable weight indicator, a series of movable discharge platforms successively arranged to one side of the weighing platform, an electromagnetic means controlling the discharge movement of each of the movable discharge platforms, intermittently operable conveyor means adapted to move an article to be graded successively onto the weighing platform and onto the movable discharge platforms, means including a shaft for driving the conveyor means, a series of photoelectric means associated with the movable weight indicator and selectively with each of the electromagnetic means, a switch element connecting each of the photoelectric means with its respective electromagnetic means, the switch being associated with the shaft and operated in synchronism with the conveyor means, each of the photoelectric means being classified within a particular weight range and adapted upon movement of the movable weight indicator and in its particular weight range by the movement of the article upon the weighing platform to cause operation of its associated electromagnetic means and movable discharge platforms to discharge the article upon timed movement of the article upon the particular movable discharge platform.

3. In combination with a grading device comprising a weighing means having a weighing platform operatively connected with a movable weight indicator, a series of movable discharge platforms successively arranged to one side of the weighing platform, an intermittently operable conveyor means adapted for moving an article to be graded successively onto the weighing platform and onto the movable discharge platforms, an electromagnetic means controlling the discharge movement of each of the movable discharge platforms, a series of photoelectric means associated with the movable weight indicator within a particular weight range, and means selectively connecting each of the photoelectric means with its respective electromagnetic means whereby the particular photoelectric means affected by the light reflected by the movable weight indicator upon movement of the article upon the weighing platform will cause operation of its associated electromagnetic means and its corresponding discharge platform to discharge the article upon timed movement of the article by the conveyor means upon the particular discharge platform, said means comprising a series of movable mechanical switch elements movable in unison with the conveyor means, each of the switch elements having therein a series of spaced movable contact elements, a pivoted armature controlling the movement of the movable contact elements of each of the switch elements, an electrical circuit for each of the photoelectric means embodying the particular photoelectric means, a source of power and an electromagnetic coil, the coil being adapted to pivot its respective armature and an electrical circuit for each of the electromagnetic means embodying the particular electromagnetic means, a source of power and an electrical contact member, the electrical contact member being controlled by movement of the movable contact elements by the pivoted armature.

4. In combination with a grading device comprising a weighing means having a weighing platform operatively connected with a movable weight indicator, a series of movable discharge platforms successively arranged to one side of the weighing platform, an intermittently operable conveyor means adapted for moving an article to be graded successively onto the weighing platform and onto the movable discharge platforms, an electromagnetic means controlling the discharge movement of each of the movable discharge platforms, a series of photoelectric means associated with the movable weight indicator within a particular weight range, and means selectively connecting each of the photoelectric means with its respective electromagnetic means whereby the particular photoelectric means affected by the light reflected by the movable weight indicator upon movement of the article upon the weighing platform will cause operation of its associated electromagnetic means and its corresponding discharge platform to discharge the article upon timed movement of the article by the conveyor means upon the particular discharge platform, said means comprising a series of movable mechanical switch elements movable in unison with the conveyor means, each of the switch elements having therein a series of spaced movable contact elements, a pivoted armature controlling the movement of the movable contact elements of each of the switch elements, an electrical circuit for each of the photoelectric means embodying the particular photoelectric means, a source of power and an electromagnetic coil, the coil being adapted to pivot its respective armature and an electrical circuit for each of the electromagnetic means embodying the particular electromagnetic means, a source of power and an electrical contact member, the electrical contact member being controlled by movement of the movable contact elements by the pivoted armature and cam means for replacing the movable contact elements following contact of the electrical contact member.

5. In combination with a grading device comprising a weighing means having a weighing platform operatively connected with a movable weight indicator, a series of movable discharge platforms successively arranged to one side of the weighing platform, an intermittently operable conveyor means adapted for moving an article to be graded successively onto the weighing platform and onto the movable discharge platforms, an electromagnetic means controlling the discharge movement of each of the movable discharge platforms, a series of photoelectric means associated with the movable weight indicator within a particular weight range, and means selectively connecting each of the photoelectric means with its respective electromagnetic means whereby the particular photoelectric means affected by the light reflected by the movable weight indicator upon movement of the article upon the weighing platform will cause operation of its associated electromagnetic means and its corresponding discharge platform to discharge the article upon timed movement of the article by the conveyor means upon the particular discharge platform, said means comprising a rotatable mechanical switch element rotated in unison with the conveyor means and including a series of spaced disks, each disk having therein a series of movable contact elements, an armature controlling the movement of the movable contact elements of each of the disks, an electrical circuit for each of the photoelectric means embodying the particular photoelectric means, a source of power and an electromagnetic coil, the coil being adapted to move its respective armature and an electrical circuit for each of the electromagnetic means embodying the particular electromagnetic means, a source of power and an electrical contact member, the electrical contact member being controlled by movement of the movable contact elements by the armature.

6. In combination with a grading device comprising a weighing means having a weighing platform operatively connected with a movable weight indicator, a series of movable discharge platforms successively arranged to one side of the weighing platform, an intermittently operable conveyor means adapted for moving an article to be graded successively onto the weighing platform and onto the movable discharge platforms, an electromagnetic means controlling the discharge movement of each of the movable discharge platforms, a series of photoelectric means associated with the movable weight indicator within a particular weight range, and means selectively connecting each of the photoelectric means with its respective electromagnetic means whereby the particular photoelectric means affected by the light reflected by the movable weight indicator upon movement of the article upon the weighing platform will cause operation of its associated electromagnetic means and its corresponding discharge platform to discharge the article upon timed movement of the article by the conveyor means upon the particular discharge platform, said means comprising a rotatable mechanical switch element rotated in unison with the conveyor means and including a series of spaced disks, each disk having therein a series of spaced axial openings and a slidable contact pin in each of the openings, means adapted normally to maintain each of the pins outwardly of one face of their respective disk, a pivoted armature positioned relative to each of the disks and adapted for pressing singularly the pins of its respective disk outwardly of the opposite face of the disk, an electrical circuit for each of the photoelectric means embodying the particular photoelectric means, a source of power and an electromagnetic coil, the coil being adapted to pivot its respective armature and an electrical circuit for each of the electromagnetic means embodying the particular electromagnetic means, a source of power and an electrical contact member, the electrical contact member being controlled by the pins of its respective disk following pressing of the pins to the opposite face of the disk.

7. In combination with a grading device comprising a weighing means having a weighing platform operatively connected with a movable weight indicator, a series of movable discharge platforms successively arranged to one side of the weighing platform, an intermittently operable conveyor means adapted for moving an article to be graded successively onto the weighing platform and onto the movable discharge platforms, and means including a shaft for driving the conveyor means; an electromagnetic means controlling the discharge movement of each of the movable discharge platforms, a series of photoelectric means associated with the movable weight indicator within a particular weight range, and means selectively connecting each of the photoelectric means with its respective electromagnetic means whereby the particular photoelectric means affected by the light reflected by the movable weight indicator upon movement of the article upon the weighing platform will cause operation of its associated electromagnetic means and its corresponding discharge platform to discharge the article upon timed movement of the article by the conveyor means upon the particular discharge platform, said means comprising a rotatable mechanical switch element rotated in unison with the conveyor means and including a series of spaced disks, each disk having therein a series of movable contact elements, a pivoted armature controlling the movement of the movable contact elements of each of the disks, an electrical circuit for each of the photoelectric means embodying the particular photoelectric means, a source of power and an electromagnetic coil, the coil being adapted to pivot its respective armature and an electrical circuit for each of the electromagnetic means embodying the particular electromagnetic means, a source of power and an electrical contact member, the electrical contact member being controlled by movement of the movable contact elements by the pivoted armature and a second electrical contact member included within the first mentioned circuit and controlled by operation of the conveyor drive means shaft for preventing closure of the first mentioned circuit until complete balancing of the weighing means has been reached.

8. A grading device comprising a weighing means having a movable weight indicator, a series of discharge means, intermittently operable transfer means adapted to move an article to be graded successively to the weighing means and to the discharge means, a series of detecting means associated with the movable weight indicator and selectively with each of the discharge means, said movable weight indicator having a plurality of means for cooperating with said series of detecting means, a series of timing means for synchronizing the release of the discharge means with appropriate movement of the intermittently operable moving means, each of the detecting means being classified within a particular weight range and adapted upon movement of the movable weight indicator in its particular weight range upon movement of the article upon the weighing means to cause operation of its associated discharge means to discharge the article upon timed movement of the article to the particular discharge means.

CHARLES T. WALTER.